Feb. 21, 1961 A. A. LAHTI 2,972,740
SHAFT POSITION DIGITIZER
Filed April 25, 1955 6 Sheets-Sheet 1

FIG. I.

INVENTOR.
ARVO A. LAHTI
BY
Christie, Parker & Hale
ATTORNEYS

Feb. 21, 1961

A. A. LAHTI

2,972,740

SHAFT POSITION DIGITIZER

Filed April 25, 1955

INVENTOR.
ARVO A. LAHTI

BY

Christie, Parker & Hale

ATTORNEYS

INVENTOR.
ARVO A. LAHTI
BY
Christie, Parker & Hale
ATTORNEYS

FIG. 6.

United States Patent Office 2,972,740
Patented Feb. 21, 1961

2,972,740

SHAFT POSITION DIGITIZER

Arvo A. Lahti, Scottsdale, Ariz., assignor, by mesne assignments, to Consolidated Electrodynamics Corporation, Pasadena, Calif., a corporation of California Filed Apr. 25, 1955, Ser. No. 503,472

11 Claims. (Cl. 340—347)

This invention relates to the field of analog to digital conversion and has particular reference to apparatus and technique for providing a digital representation of the angular position of a shaft.

It is frequently desirable to convert the angular position of a shaft, such as that in a self-balancing potentiometer, into equivalent digital electric contact closures. This equivalent digital information can then be fed to other apparatus such as electric computers, recorders, typewriters, visible number displays, etc.

The operating requirements for this kind of conversion are that the digitizer apparatus add a minimum of torque to the shaft being metered as the torque added by the digitizer affects the angular position of the shaft with respect to time, and that the digital electric information produced to be unambiguous, or in other words, that it be at all times a positive representation of a proper and discrete digital value.

Shaft position analog to digital conversion is a highly competitive field, and a variety of more and less desirable shaft position diigtizers have been developed to date. All of the digitizers known involve one or more coded discs or commutators and require either translating networks or nonambiguity networks or both. These networks can be simplified by complicating the commutator, or the commutator can be made simpler by penalizing the networks. The result is that present shaft position digitizers, while tending to meet the operating requirements, are excessively complex, expensive, and large in size.

The present invention meets the operating requirements of low torque and nonambiguity and provides a superior compromise between commutator and network complexity, resulting in a simpler and less expensive apparatus.

The invention utilizes commutator means and cooperating brush means which are connected to be rotated relative to each other by a shaft whose position is to be digitized. The commutator means includes a plurality of electrically conductive segments arranged in a pattern according to a bi-quinary code, and the brush means makes electrical contact successively with the conductive segments in accordance with the bi-quinary coding of the segments. Switching means are electrically connected to the brush means and to the conductive segments and cooperate to provide an unambiguous digital output.

In a preferred embodiment the commutator means includes a plate of electrical insulating material having a substantially flat face and a plurality of electrically conductive segments disposed in approximate concentric rings on the flat face. The rings of segments are representative of units, tens, and hundreds decimal digit decades. The conductive segments of the units and tens rings are arranged according to a bi-quinary code and are interconnected by a plurality of parallel and electrically conductive strips in accordance with the bi-quinary code, the strips also being disposed on the flat face. The conductive segments of the hundreds ring are arranged in simple decimal form.

In accordance with the preferred embodiment, the invention is explained in detail with reference to the drawings, in which.

Figure 1:
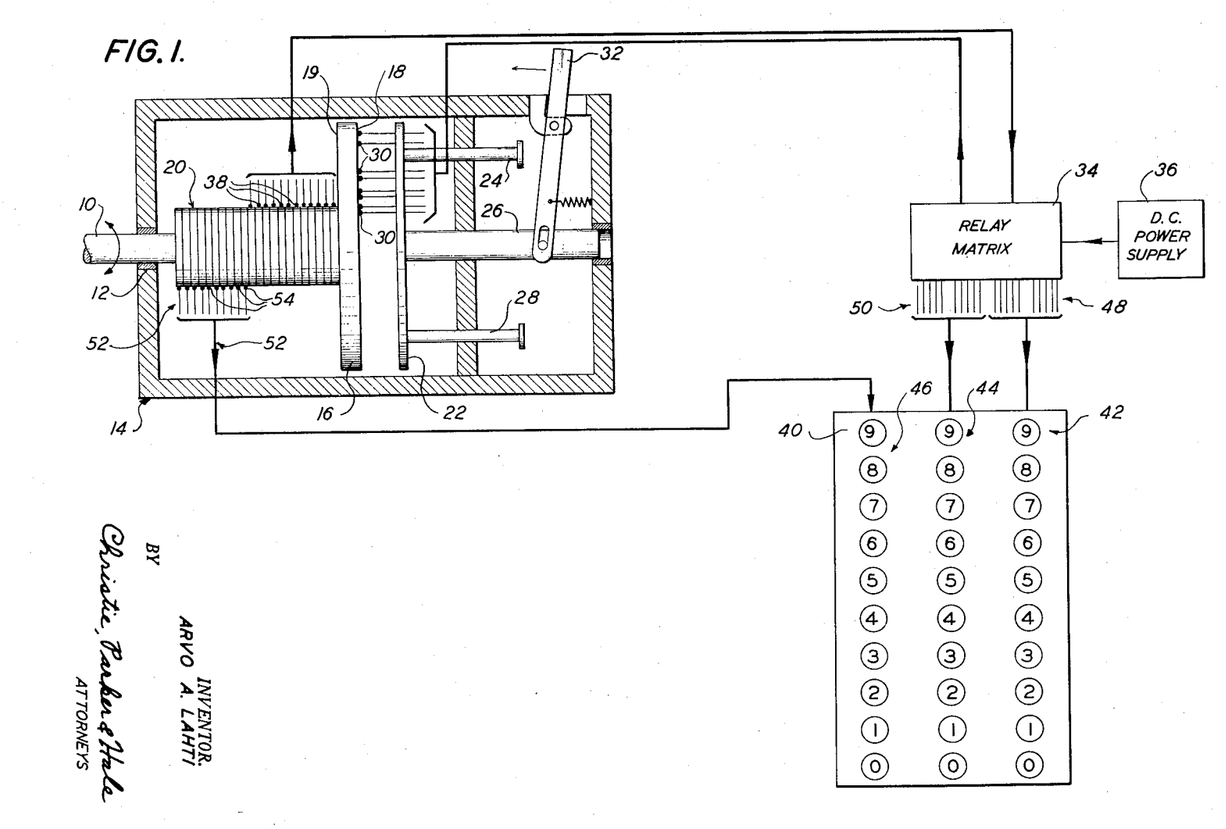
Fig. 1 is a schematic drawing of the invention.

With reference to Fig. 1, an input shaft 10 whose angular position is to be digitized is rotatably mounted through a free bearing 12 fixed at one end of a housing 14. The input shaft connects to a commutator plate 16 having a face 18 and a back side 19. An assembly of slip rings 20 is connected to the back side of the commutator plate coaxially with the input shaft for providing electrical leadout from the commutator plate. The input shaft, slip ring assembly, and commutator plate undergo angular displacement as a unit.

A brush carrier 22 is mounted at the opposite end of the housing by means of slidable rods 24, 26, 28 so that it faces the commutator plate. A plurality of plate brushes 30 are affixed to the brush carrier. A spring loaded lever arm 32 is pivoted to the housing and connected to one of the slidable rods 26 so that it serves to move the brush carrier toward and away from the face of the commutator plate.

In operation the plate brushes are normally held out of contact with the commutator and when it is desired to digitize the angular position of the input shaft the lever is actuated as shown, causing the plate brushes to engage the face of the commutator plate in sliding contact.

It should be apparent that by making suitable changes in the electrical connections the commutator plate could be mounted on the slidable rods and the input shaft used to turn the brush carrier, thereby achieving the same result as is achieved with the arrangement as shown.

A relay matrix 34 receives power from a direct current power supply 36 and is electrically connected to the plate brushes and to the commutator, the latter connection being made through a first plurality of slip ring brushes 38 which engage corresponding slip rings of the slip ring assembly 20. The relay matrix acts as a switching means which cooperates with the commutator and the plate brushes to provide a nonambiguous digital output of the system.

A visible number display 40 is connected to receive the electrical output of the digitizer. The number display has three columns of lights 42, 44, 46 representing units, tens and hundreds decimal digits respectively, the lights in each column being marked correspondingly from bottom to top with numbers running consecutively from 0 to 9. A first group of ten electric output connections 48 runs to corresponding lights in the digits column of the visible number display from the relay matrix. A second group of ten electric output connections 50 runs to corresponding lights in the tens column of the visible number display from the relay matrix. A third group of ten electrical output connections 52 runs to corresponding lights in the hundreds column of the visible number display from the commutator, this connection being made by way of a second plurality of brushes 54 which engage corresponding slip rings of the slip ring assembly 20.

In operation one revolution of the input shaft produces one revolution of the commutator plate and the number display is energized accordingly to indicate successively one thousand discrete decimal digit values consecutively from 000 to 999, or from 999 to 000, depending on the direction of rotation of the shaft. If more than one revolution is made, the number display will repeat its indicating cycle, and if desired, means could be provided to keep track of the number of revolutions.

Figure 2:
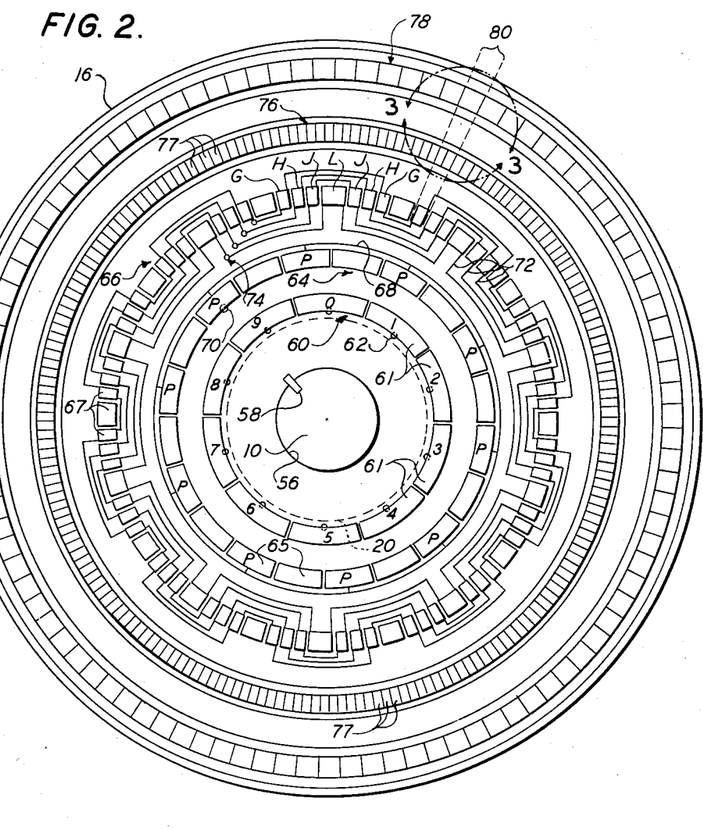
Fig. 2 is a drawing of the face of the commutator plate showing the rings of conductive segments.

With reference to Fig. 2, the commutator plate 16 is in the form of a circular disc of electric insulating material having a center bore 56 which receives the input shaft 10 and is secured thereto by a key 58. The commutator plate has a first ring 60 of conductive segments 61 centered on its face. There are ten segments in this first ring which represent in succession around the ring the consecutive hundreds decimal digits of 0 to 9, as marked, and are called hundreds segments. This arrangement is simple decimal form, and each of the hundreds segments has an electrical lead-out connection as shown at 62 which extends through the commutator plate.

A second ring 64 of conductive segments 65 and a third ring 66 of conductive segments 67 are disposed on the face of the commutator plate concentric with the hundreds ring and cooperate according to a bi-quinary code to represent tens decimal digits. The bi-quinary code is marked on the segments in the drawing with capital letters of the alphabet in order to provide a clearer explanation.

The second ring is called the tens binary ring and the conductive segments in this ring are termed tens binary segments. There are ten conductive segments equally spaced around the ring and interconnected by a conductive strip 68. Each of these segments is labeled as P to indicate its functional relation with the bi-quinary code. Between each P segment there is a space which according to the code is given the functional value of "not P." Each of these spaces may be filled with an isolated conductive segment to prevent excessive plate brush friction. As shown, these segments are unmarked. There is only one lead-out connection necessary from the tens binary ring, this being for the P segments and shown at 70. Over the angular range of one of the hundreds segments 61 there is a P segment and a "not P" space in the tens binary ring.

The segments of the third ring 66 are called the tens quinary segments. There are four electrically independent circuits in the ring as represented by the segments G, H, J, and L which are electrically connected to all other G, H, J, and L segments respectively by a plurality of conductive strips 72. The segments are arranged around the ring in ten cycles, each cycle corresponding to a succession of adjacent segments in the order of

G–H–J–L–J–H–G.

Between each cycle there is a space which corresponds to the functional value of "not G, H, J and L." As with the tens binary ring, each of these spaces may be filled by an isolated conductive segment to reduce plate brush friction and, as shown, these segments are unmarked. There are four lead-out connections necessary for the tens quinary ring, each connection being made from one of the four respective parallel circuits as shown at 74. Over the angular range of one of the hundreds segments 61, there is one cycle of tens quinary segments bounded on each side by a space representing the following succession of functional values: "not G, H, J and L" –G–H–J–L–J–H–G– "not G, H, J and L."

By imagining a radius to be sweeping over the angular range of one of the hunderds segments, it is seen that the tens binary ring provides alternately two distinguishable electrical conditions and the tens quinary ring provides five distinguishable electrical conditions, so that taken together the two rings cooperate to provide ten independent functional combinations each defining a distinguishable electrical condition. These combinations represent the tens decimal digit values from 0 to 9 in order, as shown in the following table:

$$0 = P + \text{"not } G, H, J \text{ and } L\text{"}$$
$$1 = P + G$$
$$2 = P + H$$
$$3 = P + J$$
$$4 = P + L$$
$$5 = \text{"not } P\text{"} + L$$
$$6 = \text{"not } P\text{"} + J$$
$$7 = \text{"not } P\text{"} + H$$
$$8 = \text{"not } P\text{"} + G$$
$$9 = \text{"not } P\text{"} + \text{"not } G, H, J \text{ and } L\text{"}$$

A fourth ring 76 of electrically conductive segments 77 and a fifth ring 78 of conductive segments 79 are printed on the face of the commutator plate concentric with the tens and hundreds rings. The fourth ring 76 is called the units binary ring and the fifth ring 78 is called the units quinary ring. The segments of the units binary and quinary rings cooperate in a bi-quinary code to produce ten independent combinations each defining a distinguishable electrical condition in a similar manner as was explained with reference to the tens binary and quinary rings. Over the angular range of one of the tens quinary segments, as shown by the bracket 80, these ten independent combinations represent units decimal digits from 0 to 9. This will be more apparent with reference to Fig. 3, which shows a magnified view of the units segments included in the bracket 80.

Figure 3:
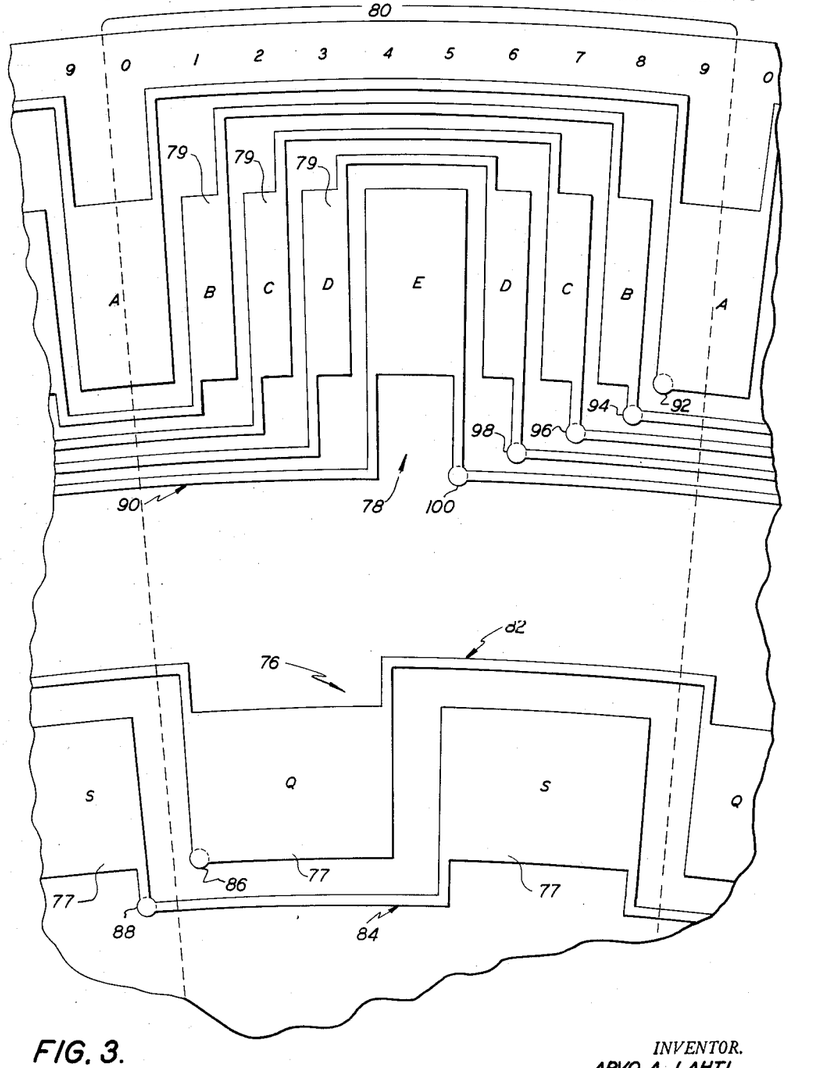
Fig. 3 is a fragmentary elevation taken in the area of line 3—3 of Fig. 2 and showing in better detail the units rings of conductive segments on the face of the commutator plate.

With reference to Fig. 3, the units binary ring 76 includes two hundred conductive segments alternately designated by Q and S around the ring. All Q segments are connected by conductive strips 82 and all S segments are connected by conductive strips 84 forming two independent electric circuits around the ring, the circuit of the Q segments having a lead-out connection 86 and the circuit of the S segments having a lead-out connection 88. Over the angular range of one of the tens segments as illustrated by bracket 80, there is one Q segment and one S segment.

The units quinary ring 78 includes five independent electric circuits as represented by segments designated as A, B, C, D and E and their corresponding electrical connection with like designated segments by way of a plurality of five parallel conductive strips as shown at 90. Each of these circuits A through E has a lead-out connection 92, 94, 96, 98 and 100 resepectively.

The units binary and quinary rings cooperate to provide ten independent functional combinations each distinguishable electrically and, over the range of one of the tens segments, these ten combinations correspond to the units decimal digits from 0 to 9 as marked in Fig. 3. By inspection, these combinations are:

$$0 = Q + A$$
$$1 = Q + B$$
$$2 = Q + C$$
$$3 = Q + D$$
$$4 = Q + E$$
$$5 = S + E$$
$$6 = S + D$$
$$7 = S + C$$
$$8 = S + B$$
$$9 = S + A$$

The basic bi-quinary code used in the units decade has two particularly favorable features. First, to go from any digit to the adjacent digit only one value has to change, this value being either in the binary or the quinary scale. Secondly, the reversal of order of the quinary scale for the second half of the decade permits the ready paralleling of the particular values without requiring crossovers. It is notable that only five external connections are required as shown at 92, 94, 96, 98 and 100. These features are consistent with low cost of manufacture, and make it possible to conveniently print all the rings of conductive segments and their electrical interconnections on the face of the commutator plate.

Both the face and the back side of the commutator plate could be provided with conductive segments. Thus in the units quinary ring one or more of the independent circuits could be printed around the outer periphery of the back side of the commutator plate and, with the addition of an extra plate brush, this would allow for the same operation as is illustrated and would tend to eliminate the lead-out connections being made through the commutator plate.

Utilizing the teachings of this disclosure, two or more commutator plates could be geared together and cooperate to produce the same result. By way of example, the units, tens and hundreds segments could be located on separate commutator plates, with the brush carriers for the commutators being intercoupled by ten to one gear reductions. While such an alteration would reduce the complexity of any one of the commutators, it introduces a large amount of inertia and tends to affect the position of the shaft which is being metered with respect to time. One of the advantageous features of the embodiment of the invention shown in Fig. 2 is that it is easily adaptable to use with one commutator plate for low inertia, and greatly simplifies the fabrication of such one plate.

Figure 4:
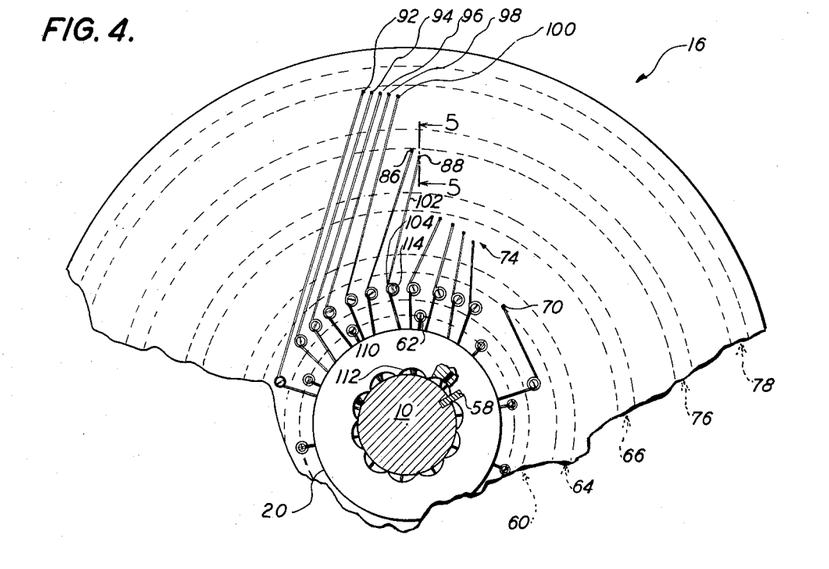
Fig. 4 is a fragmentary drawing of the back side of the commutator plate illustrating external electrical connections from the commutator plate.

Fig. 4 shows a portion of the back side of the commutator plate. In particular it describes the electrical lead-out connections to the slip ring assembly 20. These connections are illustrated by a typical lead-out connection 88 which comes from the S series of segments in the units binary ring. This lead-out connection extends through the commutator plate to the back side of the plate and connects electrically to a typical conductive strip 102 which terminates in a conductive circular segment 104. A lead wire 110 comes from one of the slip rings in the slip ring assembly 20 through an accommodating channel 112 and out to the circular segment 104. This electrical lead wire is connected to the circular segment by way of a small screw 114. Alternatively, the lead wires could be connected to the circular segments by soldering.

All of the other lead-out connections are similar to that described with reference to the external connection 88. In actual construction these various conductive strips and circular segments would be distributed symmetrically about the commutator plate, and not necessarily connected all in a bunch. The connections are bunched together for purposes of illustration.

Figure 5:
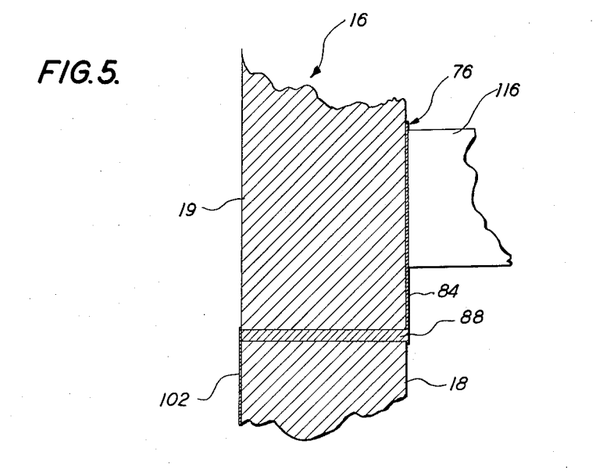
Fig. 5 is a fragmentary section taken along line 5—5 of Fig. 4 and showing the method of electrical connection between the face and back side of the commutator plate.

With reference to Fig. 5 the method of electrically connecting through the commutator plate is shown in better detail. A units binary brush 116 of the plurality of plate brushes is shown contacting an S segment of the units binary ring 76. As previously stated, this S segment is interconnected with all other S segments in the ring by conductive strips 84. The electrical lead-out connection 88 extends from the strip 84 through the commutator plate to the back side 19 of the commutator plate where it connects to a typical conductive strip 102 that extends along the surface of the back side of the commutator plate to the slip ring assembly 20.

In order to achieve readout one must make a choice between shorting and non-shorting plate brushes, the shorting type brush being a single brush which is large enough to span the gap between adjacent conductive segments and the non-shorting type brushes being dual brushes which are spaced apart by a distance so that before the lagging brush breaks contact with a segment the leading brush makes contact with the adjacent segment. Either type of brush means involves the possibility of dual readout in contacting the conductive segments.

Readout with a shorting type brush is fairly readily resolved by straightforward logical considerations. For instance in the units decade one may define zero as being in general $Q+A$, with the stipulation that $Q+S+A$ be regarded as a special version of zero and that $Q+A+B$ be regarded as a special version of one, the general value for one being $Q+B$ with $Q+B+C$ regarded as a special version of two. By application of logic we see that this resolves itself into:

$$0 = Q+A+B'$$
$$1 = Q+B+C'$$

which may be read as zero equals Q and A and "not B," and one equals Q and B and "not C." A similar logical definition of all units values from zero to nine follows:

$$0 = Q+A+B'$$
$$1 = Q+B+C'$$
$$2 = Q+C+D'$$
$$3 = Q+D+E'$$
$$4 = Q+E+S'$$
$$5 = S+E+D'$$
$$6 = S+D+C'$$
$$7 = S+C+B'$$
$$8 = S+B+A'$$
$$9 = S+A+Q'$$

Figure 6:
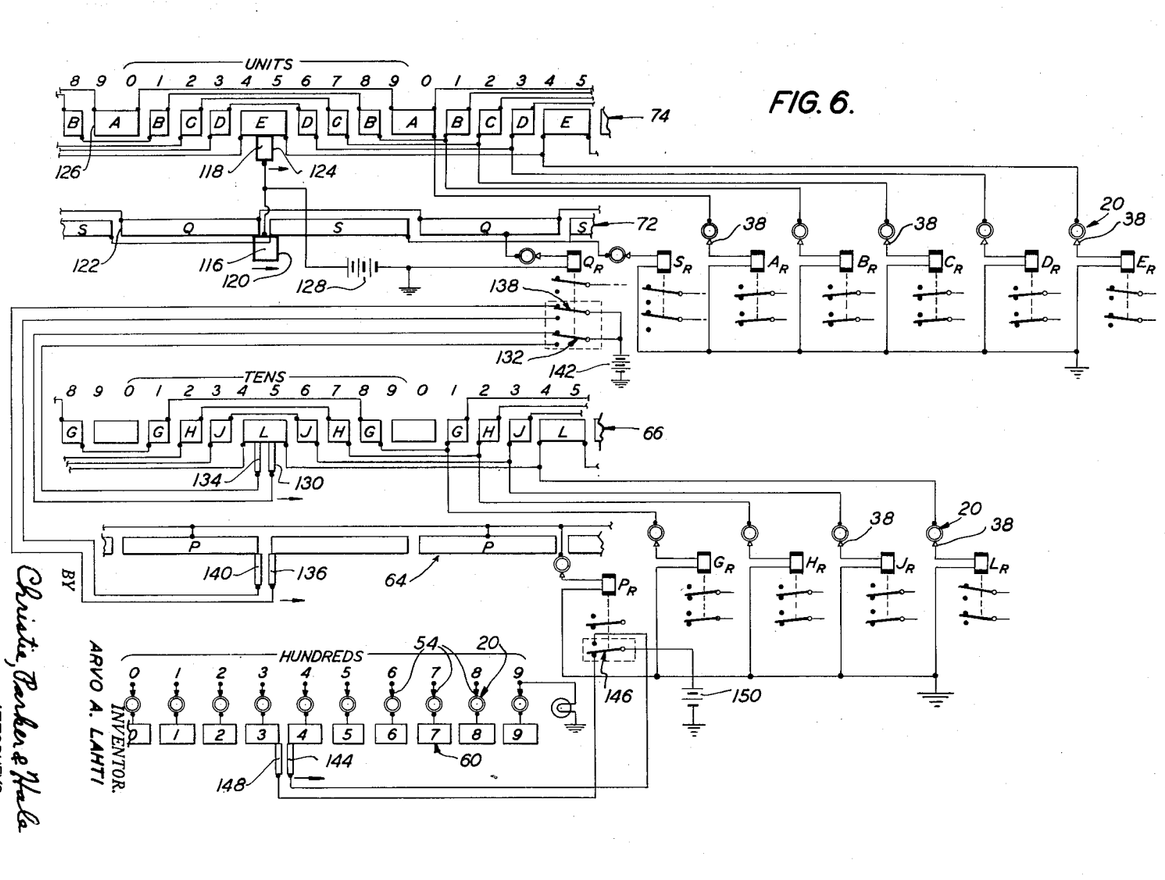
Figs. 6 and 7 are schematic drawings of the overall electrical circuitry, and illustrate how the switching means cooperates to provide an unambiguous digital output.

With reference to Fig. 6, the units binary brush 116 cooperates with a units quinary brush 118 to achieve readout of the units decade, both brushes being of the shorting type. The units binary brush has a leading edge 120, and the units binary segments have typical leading edges as shown at 122. Likewise, the units quinary brush has a leading edge 124 and the units quinary segments have typical leading edges as at 126.

Imagine the brushes to be displaced ot the left where the quinary brush would be contacting A and the binary brush would be contacting S, corresponding to the code expression $S+A+Q'$ which is the general expression for nine. As the brushes move to the right, the leading edge of the binary brush makes contact with the leading edge of the Q segment changing the code expression from $S+A+Q'$ to $Q+S+A+B'$ which correspondingly changes the readout from nine to zero, the $Q+S+A+B'$ expression having all the terms of the general requirement of $Q+A+B'$ as the expression for zero. As the brushes advance further, the binary brush breaks contact with S, changing the code expression from $Q+S+A+B'$ to $Q+A+B'$, which does not affect the readout. A further advancement of the brushes causes the leading edge of the quinary brush to make contact with the leading edge of the B segment changing the code expression from $Q+A+B'$ to $Q+A+B+C'$ which correspondingly changes the readout from zero to one, the $Q+A+B+C'$ expression having all the terms of the general requirement $Q+B+C'$ for the value one. Such analysis carries on through the units decade.

From the foregoing, it should be evident that only the leading edges of the brushes and segments are critical. As will appear, the units decades control the readout of the tens and hundreds. Thus, the leading edges only in the units decade are critical. These features result in substantial manufacturing convenience.

Equivalent logical expressions for the units readout from zero to nine could be derived using Q and Q' as the binary values rather than Q and S. This would eliminate the necessity for the S segments and connections, but would require critical control of both leading and lagging edges of the binary brush and the Q segments to obtain the critical transfer Q to Q'.

To simplify the circuitry in the relay matrix, it is convenient to add certain "not" terms to the units biquinary code. For instance, if the units quinary shorting brush 118 is contacting A, then C, D, and E are in the "not" or C', D' and E' states, and these terms may be added to the logical expressions $S+A+Q'$ or $Q+A+B'$ at will. Applying these teachings, the following logical expressions are derived:

$$0 = Q + A + B' + C' + D' + E'$$
$$1 = Q + B + C' + D' + E'$$
$$2 = Q + C + D' + E'$$
$$3 = Q + D + E'$$
$$4 = Q + E + S'$$
$$5 = S + E + D' + C' + B' + A'$$
$$6 = S + D + C' + B' + A'$$
$$7 = S + C + B' + A'$$
$$8 = S + B + A'$$
$$9 = S + A + Q'$$

In all of the above expressions, the first three terms are the necessary logical terms, the rest being added to permit the consolidation of contacts and the use of double-pole double-throw relays. The above expressions constitute the operating units bi-quinary code for the invention, each defining a distinguishable electrical condition, and should be compared with the units readout circuitry of Fig. 7.

Both the units binary and quinary brushes are connected to the positive terminal of a battery 128. As these brushes make contact with the conductive segments in the units binary and quinary rings, current flows through corresponding relay coils of the relay matrix actuating the switches of these relays. As shown in Fig. 6, there is a corresponding relay in the relay matrix 34 connected through a separate slip ring of the slip ring assembly 20 and its cooperating brush of the first plurality of brushes 38 to each of the independent electrical circuits of the units quinary and binary rings. These relays are designated accordingly as $A_r$, $B_r$, $C_r$, $D_r$, $E_r$, $Q_r$ and $S_r$.

Excepting the $Q_r$ relay which has three armatures actuated by its coil, all relays are conveniently of the double-pole double-throw type or, in other words, have two armatures actuated by the relay coil. Fig. 6 shows the armatures of the $Q_r$, $S_r$, and $E_r$ relays in their actuated or front position and the armatures of the $A_r$, $B_r$, $C_r$ and $D_r$ relays in their unactuated or back position. This is in accordance with the shown position of the brushes.

Since the critical $Q'$ to $Q$ transition is available from the units decade, controlled readout of the tens decade may be achieved by a dual non-shorting brush technique. This technique resolves ambiguity in both the tens binary and quinary rings in accordance with the $Q'$ to $Q$ transition and makes it possible to use the complementary values $R$ and $R'$ as the tens binary values, and to use a tens quinary system wherein the fifth value is the absence of all the four discrete values G, H, J and L.

By applying the teachings heretofore disclosed, the following set of logical expressions is derived for the tens decade:

$$0 = P + G' + H' + J' + L'$$
$$1 = P + G + H' + J' + L'$$
$$2 = P + H + J' + L'$$
$$3 = P + J + L'$$
$$4 = P + L$$
$$5 = P' + L$$
$$6 = P' + J + L'$$
$$7 = P' + H + J' + L'$$
$$8 = P' + G + H' + J' + L'$$
$$9 = P' + G' + H' + J' + L'$$

As shown in Fig. 6, a leading tens quinary brush 130 is connected to the front contact of a third switch 132 of the $Q_r$ relay, and a lagging tens quinary brush 134 is connected to the back contact of the same switch. A leading tens quinary brush 136 is connected to the front contact of a second switch 138 of the $Q_r$ relay, and a lagging tens binary brush 140 is connected to the back contact of the same switch. The positive pole of a battery 142 is connected to the armatures of both the second and third switches of the $Q_r$ relay. Taken together, these two switches are called the tens toggle switches.

When the $Q_r$ relay is unactuated or in its $Q'$ state, the circuit is closed between the battery 142 and both of the lagging tens brushes and the circuit is open between the battery and both of the leading tens brushes. When the $Q_r$ relay is actuated or in its $Q$ state, the reverse is true.

The $Q'$ to $Q$ transition controls the tens readout and happens only when the leading edge of the units binary shorting brush contacts the leading edge of a Q segment, changing the units decade expression from $S + A + Q'$ to $Q + A + B' + C' + D' + E'$ and causing the units readout to change from nine to zero. Thus when the units readout changes from nine to zero or, if running in the opposite direction, from zero to nine, the tens readout will increase or decrease by one digit accordingly. Using the same relay to control both the units and tens readouts in this respect serves to eliminate any ambiguity by causing these respective readouts to change at the same time for all practical purposes.

The electrical operation in the tens decade may be illustrated by imagining the tens binary brushes to be contacting a P segment with the tens quinary brushes both contacting a J segment and the $Q_r$ relay in its $Q'$ state thus energizing the lagging brushes. This position corresponds to the tens expression $P + J + L'$ or a tens readout of three. As the brushes move to the right, the leading quinary brush makes contact with an L segment but since the brush is not energized this does not affect the tens readout. The next event is the units readout changing from nine to zero caused by a $Q'$ to $Q$ transition which, at the same time, energizes the leading tens brushes causing the contact with the L segment to become significant and changing the tens expression from $P + J + L'$ to $P + L$ or the tens readout from three to four.

As the brushes move farther, the lagging tens quinary brush makes contact with the L segment while the leading tens binary brush is still on the P segment. As Q goes to $Q'$, which is sometime after the units readout has changed from four to five, the lagging tens brushes are energized. However, this does not change the tens expression or readout and is not a critical transition. The next event is the leading tens binary brush breaking contact with the P segment, and shortly thereafter, a $Q'$ to $Q$ transition which switches the circuit back through the leading tens brushes causing the tens expression to change from $P + L$ to $P' + L$ or the tens readout to go from four to five. This analogy carries through the tens decade.

As with the units decade, there is a relay in the relay matrix 34 corresponding to each of the independent electric circuits of the tens quinary and binary rings, the corresponding relays being designated as $G_r$, $H_r$, $J_r$, $L_r$ and $P_r$ accordingly. As the tens brushes make electrical contact with the segments of the tens quinary and binary rings and are energized, the coils of the corresponding relays are energized through separate slip rings of the slip ring assembly 20 cooperating with separate brushes of the first plurality of brushes 38. Each of the tens relays are of the double-pole double-throw type, having two armatures actuated by the coil.

Being the last order in this case, the hundreds decade is retained in simple decimal form and, since the transfer from $P'$ to $P$ is controlled by the $Q'$ to $Q$ transition, the $P'$ to $P$ transition is an entirely satisfactory and unambiguous control for the hundreds decade.

With reference to Fig. 6, a leading hundreds brush 144 is connected to the front contact of a second switch 146 of the $P_r$ relay, called the hundreds toggle switch, and a lagging hundreds brush 148 is connected to the back contact of this same switch. The positive pole of a battery 150 is connected to the pole of the hundreds toggle switch.

With the lagging hundreds brush contacting a "three" segment and the leading hundreds brush contacting a "four" segment and the $P_r$ relay in its P' state, the hundreds readout is three, the lagging hundreds brush being energized. As the brushes move to the right, a P' to P transition is caused by a Q' to Q transition and, before the lagging hundreds brush breaks contact with the three segment, the leading hundreds brush is energized causing the hundreds readout to go from three to four. As the Q' to Q and P' to P transition takes place only at the time the units and tens readout both change from nine to zero respectively, the entire system is unambiguous. This analogy carries on through the hundreds decade.

Unlike the units and tens decades, the hundreds has a direct output to the visible number display 40. Thus, as the hundreds brushes contact the various hundreds segments and are energized, corresponding lights in the hundreds column 46 of the visible number display are energized through separate slip rings of the slip ring assembly 20 and cooperating brushes of the second plurality of brushes 54. A typical light of the hundreds column is shown in Fig. 6.

Figure 7:
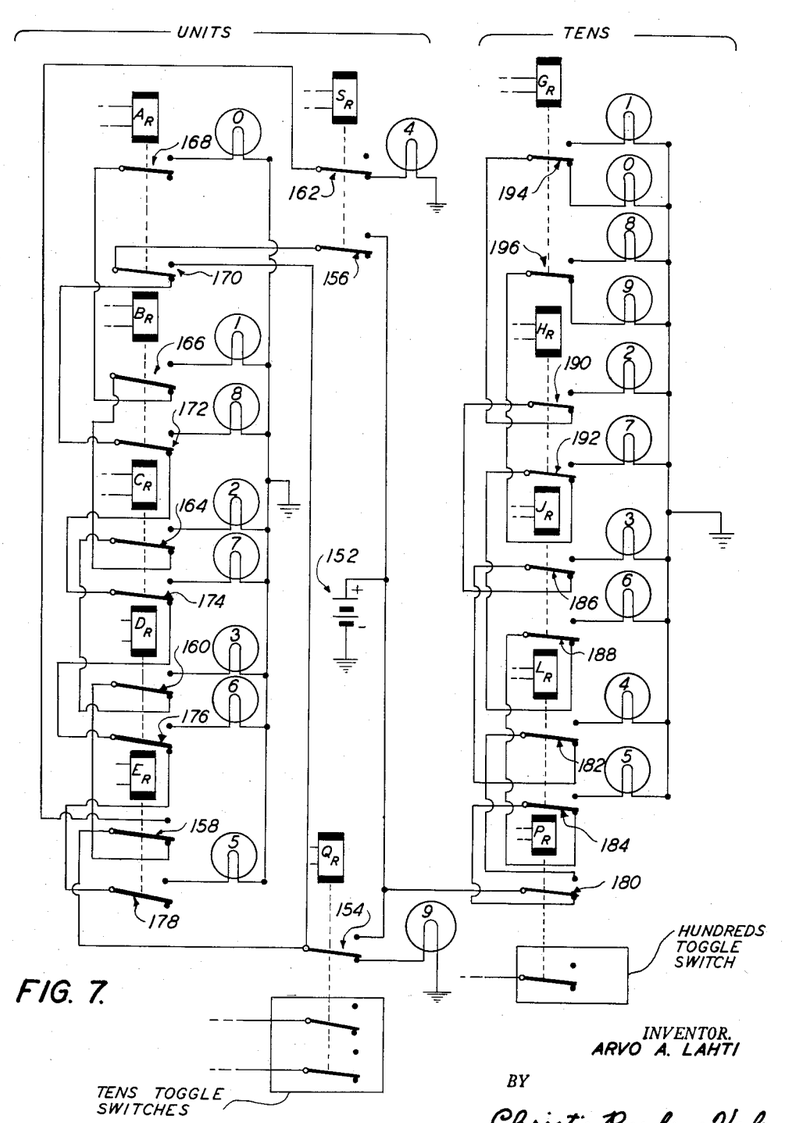

Fig. 7 shows the electrical interconnection between the units and tens relay switches, and the connections between the switches and the corresponding lights of the visible number display. All switches are shown in their normal or unactuated position.

With reference to Fig. 7, the positive pole of a battery 152 is electrically connected to the front contact of a first $Q_r$ relay switch 154 and to the front contact of a second $S_r$ relay switch 156. The back contact of the first $Q_r$ relay switch is connected to the number nine units digit light in the units column of the visible number display, and the pole of the switch is connected to the pole of a first $E_r$ relay switch 158.

The back contact of the first $E_r$ relay switch is electrically connected to the pole of a first $D_r$ relay switch 160, and the front contact is electrically connected to the pole of a first $S_r$ relay switch 162 whose back contact is connected to the units digit light number four. The front contact of the first $D_r$ relay switch is connected to the number three units digit light, and the back contact is connected to the pole of a first $C_r$ relay switch 164.

The front contact of the first $C_r$ relay switch is electrically connected to the number two units digit light, and the back contact is connected to the pole of a first $B_r$ relay switch 166.

The front contact of the first $B_r$ relay switch is electrically connected to the number one units digit light, and the back contact is connected to the pole of a first $A_r$ relay switch 168 whose front contact is connected to number zero units digit light.

The pole of the second $S_r$ relay switch is electrically connected to the pole of a second $A_r$ relay switch 170. The front contact of the second $A_r$ relay switch is connected to the pole of the first $Q_r$ relay switch, and the back contact is connected to the pole of a second $B_r$ relay switch 172.

The front contact of the second $B_r$ relay switch is electrically connected to the number eight units digit light, and the back contact is connected to the pole of a second $C_r$ relay switch 174. The front contact of the second $C_r$ relay switch is connected to the number seven units digit light, and the back contact is connected to the pole of a second $D_r$ relay switch 176.

The front contact of the second $D_r$ relay switch is electrically connected to the number six units digit light, and the back contact is connected to the pole of a second $E_r$ relay switch 178 whose front contact is electrically connected to number five units digit light.

All of the units digit lights are grounded, and the negative terminal of the battery 152 is grounded.

As an example of operation, consider the units digit readout of zero. This corresponds to the code expression $Q+A+B'+C'+D'+E'$ which indicates that the $Q_r$ and $A_r$ relays are energized and the $B_r$, $C_r$, $D_r$, and $E_r$ relays are not energized. Thus, in Fig. 7, the switches of the $Q_r$ and $A_r$ relays must be regarded as actuated or switched to their front contacts. Tracing the circuitry in the figure, the battery 152 feeds through the first $Q_r$ relay switch, through the first $E_r$ relay switch, through the first $D_r$ relay switch, through the first $C_r$ relay switch, through the first $B_r$ relay switch, through the first $A_r$ relay switch, through the number zero units digit light in the units column of the visible number display, and through ground back to the battery.

With regard to the switches of the tens relays, the positive pole of the battery 152 is electrically connected to the pole of a first $P_r$ relay switch 180. The front contact of the first $P_r$ relay switch is connected to the pole of a first $L_r$ relay switch 182, and the back contact is connected to the pole of a second $L_r$ relay switch 184.

The front contact of the first $L_r$ relay switch is electrically connected to the number four tens digit light in the tens column of the visible number display, and the back contact is connected to the pole of a first $J_r$ relay switch 186. The front contact of the second $L_r$ relay switch is connected to the number five tens digit light, and the back contact is connected to the pole of a second $J_r$ relay switch 188.

The front contact of the first $J_r$ relay switch is electrically connected to the number three tens digit light, and the back contact is connected to the pole of a first $H_r$ relay switch 190. The front contact of the second $J_r$ relay switch is connected to the number six tens digit light, and the back contact is connected to the pole of a second $H_r$ relay switch 192.

The front contact of the first $H_r$ relay switch is electrically connected to the number two tens digit light, and the back contact is connected to the pole of a first $G_r$ relay switch 194 whose front contact is connected to the number one tens digit light and whose back contact is connected to the number zero tens digit light.

The front contact of the second $H_r$ relay switch is electrically connected to the number seven tens digit light, and the back contact is connected to the pole of a second $G_r$ relay switch 196 whose front contact is connected to the number eight tens digit light, and whose back contact is connected to the number nine tens digit light.

To illustrate the operation of the tens circuitry, consider the tens digit readout of zero. This corresponds to the code expression of $P+G'+J'+H'+L'$ which indicates that the $P_r$ relay is energized and that the $G_r$, $H_r$, $J_r$, and $L_r$ relays are in their unenergized states. Thus, the switches of the $P_r$ relay are actuated or switched to their front contacts. Following the circuitry, the battery 152 feeds through the first $P_r$ relay switch, through the first $L_r$ relay switch, through the first $J_r$ relay switch, through the first $H_r$ relay switch, through the first $G_r$ relay switch, through the number zero tens digit light of the visible number display, and through ground back to the battery.

Since the shaft position digitizer is to be used in conjunction with other instruments, it should be apparent that any particular model of shaft position digitizer utilizing the present invention will have to be particularly adapted for the instrument with which it is to be used. Thus, while the drawings of this disclosure illustrate a digitizer which divides a complete circle into one thousand counts, the invention is easily applied to divide any reasonable portion of a circle into one thousand counts or, conveniently, into any other reasonable number of counts in accordance with the bi-quinary coding technique.

The mechanical features shown in the drawings, such as the mountings for the commutator plate and brush carrier, are simplified so that they do not interfere with a clear explanation of the invention. Any suitable mechanical means may be substituted that will perform the same function.

As used in this text, the adjective "binary" means arranged or characterized by two. Hence, in its simplest form, a binary representation of an angular position within an angular interval consists of a first representation which includes all positions within one-half of the angular interval and a second representation which includes all positions within the second half of the angular interval. If there are successive angular intervals involved, the binary representation repeats itself. This is analogous to the A and S segments shown in Fig. 3 over the angular interval 80.

The adjective "quinary" means characterized or arranged by fives. Hence, a quinary representation of an angular position within an angular interval involves five distinct representations respectively corresponding to angular positions within respective one-fifth portions of the angular interval. As before, where successive angular intervals are involved, the quinary representation is repeated for each interval. This is illustrated in Fig. 3 where one quinary representation corresponds to half of the segment A, segment B, segment C, segment D, and half of segment E, with the angular interval being half of the interval 80.

The adjective "bi-quinary" means characterized by the combination of binary and quinary arrangements. The quinary representation of five parts is repeated in each of two angular intervals corresponding to the two parts of the binary representation. This yields a total of ten independent combinations, as illustrated over the angular interval 80 of Fig. 3.

I claim:

1. In apparatus for providing a digital representation of the angular position of a shaft having a commutator, brush means providing electrical connections to the commutator, and means coupled to the shaft for providing relative rotation between the commutator and the brush means, the improvement which comprises at least one set of binary segments and one set of quinary segments located on the commutator, with the segments of the binary set having two segments for each ten units of rotation to be measured and with the segments of the quinary set having one large segment and three segments which are approximately one-half the size of the large segment for each binary segment, and the brush means being positioned to contact adjacent binary segments when the brush means for the quinary segments is located approximately midway along a large segment of the quinary segments.

2. In apparatus for providing a digital representation of the angular position of a shaft having a commutator, brush means providing electrical connections to the commutator, and means coupled to the shaft for providing relative rotation between the commutator and the brush means, the improvement which comprises at least one binary set of electrically conductive segments located on the commutator, a first set of electrically conductive strips for interconnecting the segments of the binary set to provide two electrically independent binary circuits, at least one quinary set of electrically conductive segments located on the commutator, a second set of electrically conductive strips for interconnecting the segments of the quinary set to provide five electrically independent quinary circuits, with the segments of the binary set having two segments for each ten units of rotation to be measured and with the segments of the quinary set having one large segment and three segments which are approximately one-half the size of the large segment for each segment of the binary set, and the brush means being positioned to bridge the space between adjacent segments of the binary set when the brush means is located approximately midway along a large segment of the quinary set.

3. Apparatus in accordance with claim 2 wherein the brush means includes a first brush for making successive electrical contact with the conductive segments of the binary set and a second brush for making successive electrical contact with the conductive segments of the quinary set, both brushes being of the shorting type in that they are wider than the spaces between the segments.

4. In apparatus for providing a digital representation of the angular position of a shaft having a commutator, brush means providing electrical connections to the commutator, and means coupled to the shaft for providing relative rotation between the commutator and the brush means, the improvement which comprises at least one binary set of electrically conductive segments located on the commutator, at least one quinary set of electrically conductive segments located on the commutator, with the segments of the binary set having two segments for each ten units of rotation to be measured and with the segments of the quinary set having one large segment and three segments which are approximately one-half the size of the large segment for each binary segment, and the brush means being positioned to bridge the space between adjacent segments of the binary set when the brush means is located approximately midway along a large segment of the quinary set, and relay means electrically connected to the brush means and to the binary and quinary sets of segments for providing contact closures representing decimal digits in accordance with the electrical contacts made between the brush means and the segments.

5. In apparatus for providing a digital representation of the angular position of a shaft having a commutator, brush means providing electrical connections to the commutator, and means coupled to the shaft for providing relative rotation between the commutator and the brush means, the improvement which comprises a first binary set and first quinary set of electrically conductive segments located on the commutator, and a second binary set and second quinary set of electrically conductive segments located on the commutator, with the segments of the first binary set having two segments for each ten units of rotation to be measured and with the segments of the first quinary set having one large segment and three segments of approximately one-half the size of the large segment for each segment of the first binary set, the brush means including shorting type brushes for making electrical contact with the segments of the first binary and first quinary sets and dual non-shorting type brushes for making electrical contact with the segments of the second binary and second quinary sets, the brush means for the first binary set being positioned to bridge the space between adjacent segments of the first binary set when the brush means for the first quinary set is located approximately midway along a large segment of the first quinary set.

6. In apparatus for providing a digital representation of the angular position of a shaft having a commutator, brush means providing electrical connections to the commutator, and means coupled to the shaft providing relative rotation between the commutator and the brush means, the improvement which comprises a first binary set of electrically conductive segments located on the commutator and having alternate segments interconnected by parallel conductive strips to provide two electrically independent binary circuits of the set, the brush means including a first brush for making successive electrical contact with segments of the first binary set, a first quinary set of electrically conductive segments located on the commutator and being interconnected by parallel conductive strips to provide five electrically independent circuits of the set, the brush means including a second brush for making successive electrical contact with the segments of the first quinary set, the segments of the first binary set and first quinary set cooperating to represent units decimal digits, a second set of electrically conductive binary segments located on the commutator and being separated by spaces approximately equal in size to the segments, the segments of the second binary set being interconnected by electrically conductive strips to provide one electrical circuit of the set, the brush means including a third and fourth brush spaced apart and adapted to make successive electrical contact with the segments of the second binary set, a second set of quinary segments located on the commutator and being interconnected by parallel electrically conductive strips to provide four electrically independent circuits of the set, the brush means including a fifth and sixth brush spaced apart and adapted to make successive electrical contact with the segments of the second quinary set, the segments of the second binary set and second quinary set cooperating to represent tens decimal digits, a simple decimal set of ten electrically conductive segments located on the commutator to represent hundreds decimal digits, the brush means including a seventh and eighth brush spaced apart and adapted to make successive electrical contact with the segments of the simple decimal set, and relay means electrically connected to the electrically independent circuits in the first and second binary and quinary rings and to the brushes of the brush means for making contact closures providing units, tens and hundreds decimal readouts in accordance with the electrical contacts made between the brush means and the segments located on the commutator plate.

7. Apparatus according to claim 6 wherein each set of electrically conductive segments is arranged in a ring, all rings being located approximately concentric on one face of the commutator.

8. Apparatus in accordance with claim 6 wherein the relay means includes a first relay which is electrically connected to one of the electrically independent circuits of alternate segments of the first binary set, the first relay being responsive to the successive electrical contacts made between the first brush of the brush means and the said alternate segments of the first binary set for providing contact closures which control the energization of the other brushes of the brush means, causing the units readout to control the tens and hundreds readout and increasing the allowable dimensional tolerances for the segments of the second binary and quinary sets and the simple decimal set.

9. Apparatus for providing a representation of the angular position of a shaft comprising first commutating means coupled to the shaft and including a segmented conductive pattern and cooperating brush means arranged to provide a first distinguishable electrical condition when the shaft is oriented within the first half of any of a plurality of predetermined angular intervals and a second distinguishable electrical condition when the shaft is oriented within the second half of any of said angular intervals, second commutating means coupled to the shaft and including a segmented conductive pattern and cooperating brush means arranged to provide five distinguishable electrical conditions respectively corresponding to orientation of the shaft within respective one-fifth portions of the first half of any of the angular intervals and for providing the same five distinguishable electrical conditions in reverse order and respectively corresponding to orientation of the shaft within respective one-fifth portions of the second half of any of the angular intervals, and means responsive to the electrical conditions provided by the first and second commutating means for providing ten distinguishable electrical conditions respectively corresponding to orientation of the shaft within respective one-tenth portions of any of the angular intervals, a third commutating means coupled to the shaft and including a segmented conductive pattern and cooperating brush means arranged to provide a distinguishable electrical condition when the shaft is oriented within the first half of any of the respective one-tenth portions of any of said angular intervals and a different and distinct electrical condition where the shaft is oriented within the second half of any of said one-tenth portions of any of said angular intervals, fourth commutating means coupled to the shaft and including a segmented conductive pattern and cooperating brush means arranged to provide five distinct electrical conditions respectively corresponding to orientation of the shaft within respective one-fifth portions of the first half of any of said one-tenth portions of any said angular intervals and to provide the same five distinct electrical conditions in reverse order and respectively corresponding to orientation of the shaft within respective one-fifth portions of the second half of any of said one-tenth portions of any of said angular intervals, and means responsive to the electrical conditions provided by the third and fourth commutating means for providing ten distinct electrical conditions respectively corresponding to orientation of the shaft within respective one-tenth portions of any of said one-tenth portions of any of said angular intervals.

10. Apparatus of claim 9 further comprising a fifth commutating means coupled to the shaft and including a segmented conductive pattern and cooperating brush means arranged to provide a plurality of distinct electrical conditions respectively and severally corresponding to orientation of the shaft within the respective predetermined angular intervals.

11. Apparatus of claim 9 further comprising means responsive to the electrical conditions provided by the third commutating means for controlling the transition from one electrical condition to the next in the first and second commutating means.

References Cited in the file of this patent

UNITED STATES PATENTS

| | | |
|---|---|---|
| 2,318,591 | Couffignal | May 11, 1943 |
| 2,496,585 | Harper | Feb. 7, 1950 |
| 2,679,644 | Lippel | May 25, 1954 |
| 2,693,593 | Crosman | Nov. 2, 1954 |
| 2,713,680 | Ackerlind | July 17, 1955 |
| 2,754,502 | Dickinson | July 10, 1956 |
| 2,770,798 | Roth | Nov. 13, 1956 |
| 2,852,764 | Frothingham | Sept. 16, 1958 |

OTHER REFERENCES

"Electronics," March 1953, pp. 154, 155, entitled "Arithmetic Processes," by Felker.